United States Patent [19]

Robinson

[11] 4,274,948
[45] Jun. 23, 1981

[54] SEPARATION OF MINERALS

[75] Inventor: Lee F. Robinson, London, England
[73] Assignee: RTL Contactor Holding S.A., Switzerland
[21] Appl. No.: 65,432
[22] Filed: Aug. 10, 1979
[30] Foreign Application Priority Data
Aug. 11, 1978 [GB] United Kingdom ............... 33125/78
[51] Int. Cl.³ ........................... B03B 1/00; B03B 9/02
[52] U.S. Cl. ........................................ 209/9; 209/155; 209/207; 208/11 LE; 196/14.52
[58] Field of Search ................. 209/9, 207, 172, 1, 209/5, 155; 208/11 LE; 134/25 R, 25 D; 210/21, 296, 56; 196/14.52

[56] References Cited
U.S. PATENT DOCUMENTS

| | | | |
|---|---|---|---|
| 2,686,592 | 8/1954 | Miller | 209/172 X |
| 3,247,103 | 4/1966 | Shang | 210/21 |
| 3,432,030 | 3/1969 | Olivier | 209/172 X |

FOREIGN PATENT DOCUMENTS 972035 10/1964 United Kingdom .
1527269 10/1978 United Kingdom .

Primary Examiner—Ralph J. Hill
Attorney, Agent, or Firm—Bernard & Brown

[57] ABSTRACT

A process is described for the separation of impurities from an aqueous slurry, dispersion or suspension. Streams of aqueous phase and an organic phase comprising a non-polar organic liquid are passed through a multi-compartment rotary contactor. A collector reagent is present during at least part of the passage of the streams through the contactor and gives the impurities a hydrophobic surface. The phases are contacted by continuously bringing the aqueous and solvent phases into contact with one another while maintaining an interface between the two phases. The two phases and the interfacial layer containing at least some of the impurities are independently withdrawn.

9 Claims, 2 Drawing Figures

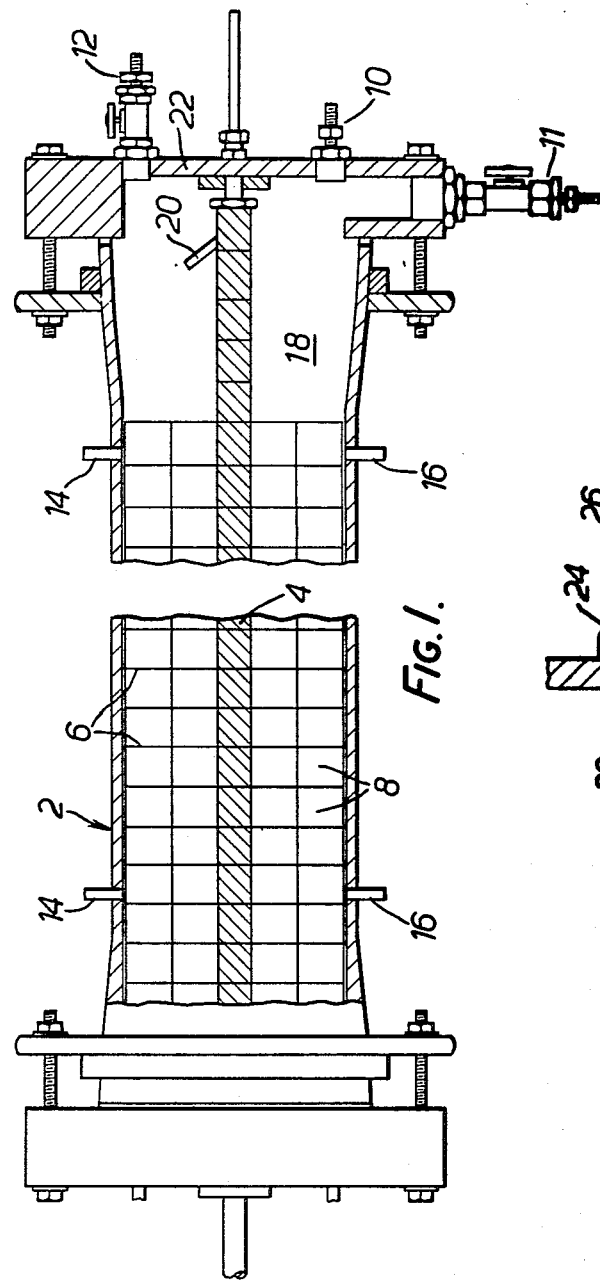
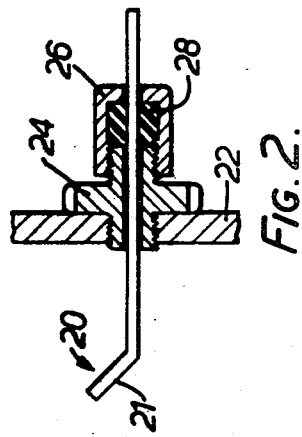

SEPARATION OF MINERALS

FIELD OF THE INVENTION

This invention relates to the separation of minerals from an aqueous aggregation of solids, and is particularly concerned with separation of oxides from an aqueous slurry containing those oxides in minor proportions and in low particle size.

BACKGROUND OF THE INVENTION

In U.K. patent specifications Nos. 1222508 and 1475881, a process has been described for removing impurities from clay and particularly china clay. In that process a suspension of the clay in water is mixed with a non-polar organic liquid and a collector which gives the impurities a hydrophobic surface. On settling, the impurities collect in an interfacial layer between the water of the suspension and the organic liquid.

The problem associated with the process of the above mentioned specifications lies in the separation of the impurities-containing interfacial layer from both the aqueous phase and the organic phase. Specification No. 1475881 has proposed a process line entailing mixers and settlers and a centrifuge, but that line, besides being expensive, is difficult to operate and is not entirely satisfactory in its effectiveness.

OBJECTS OF THE INVENTION

One of the objects of the invention is to provide a more satisfactory process for the removal of impurities from aqueous slurries, dispersions or suspensions.

A further object of the invention is to provide a process for the removal of oxide impurities from crude clay.

A further object of the invention is to provide a process for the recovery of metal values from oil sands during the extraction of bitumen oils.

These and other objects of the invention will appear from the following description.

SUMMARY OF THE INVENTION

The present invention comprises a process for the separation of impurities from an aqueous phase in the form of a slurry, dispersion or suspension comprises passing separately through a multicompartmented rotary contactor, streams of the aqueous phase and an organic phase comprising a non-polar organic liquid, a collector reagent which gives the impurities a hydrophobic surface being present during at least a part of the passage of the streams through the contactor, contacting the phases in the contactor by continuously bringing the aqueous and solvent phases into contact with one another while maintaining an interface between the two phases, removing the two phases from the contactor, and independently removing an interfacial layer between the two phases containing at least a proportion of the impurities initially in the aqueous phase.

BRIEF DESCRIPTION OF THE DRAWINGS

FIG. 1 is a diagram (partly in section) of a contactor adapted for use in accordance with the present invention.

FIG. 2 is a diagram of a detail of the contactor of FIG. 1.

DESCRIPTION OF THE PREFERRED EMBODIMENTS

The present invention entails the use of a multi-compartmented, rotary contactor, for example of the type described in U.K. Pat. No. 972035 in which liquid streams, usually countercurrent streams, one of which may contain solids, are continuously brought into contact with one another.

It will be seen that, in the invention, the contactor not only effects the contacting of the organic phase with the aqueous slurry and in the capture of the impurities into the interfacial layer, but also makes it possible to separate that layer from the other materials; the organic phase, substantially free of impurities and water, the aqueous phase containing solids but substantially free of impurities, and the interfacial layer containing the impurities are removed independently so that little further separation is required outside the contactor.

The collector, which is typically oleic acid, a long chain amine or a petroleum sulphonate, may be entered with the aqueous phase and/or the non-polar organic liquid, or it may be injected into the contactor at selected points along its length as required. In some cases, the solids being treated may naturally contain a suitable collector, in which case it is unnecessary to introduce the collector into the organic stream either before entry to the contactor or during passage through the contactor. However the collector is introduced, the action of the contactor ensures intimate mixing of the collector with the aqueous phase and hence the capture of the impurities into the interfacial layer.

In some instances it may be desirable to add to the stream of non-polar organic liquid a base to maintain the contents of the contactor slighty alkaline and/or a deflocculating agent.

The interfacial layer containing the impurities may be removed from the contactor through an opening at the end of the contactor. Alternatively, or in addition, the impurities may be removed at one or more points along the contactor length.

In each of the examples to be hereinafter described, use is made of a contactor as described in U.K. Pat. No. 972035 and in U.K. patent application No. 23633/78 consisting of a stationary drum having its axis horizontal or slightly inclined to the horizontal, and a rotor mounted for rotation within the drum. The rotor consists of a set of radial discs spaced along the drum and forming a series of compartments. The edge of each disc is spaced from the drum for the passage of the streams. The discs carry buckets which in use lift the aqueous phase into the organic phase and carry down liquid of the organic phase down into the aqueous phase. Where solids are contained in one or other of the phases, there may additionally be passages through the discs.

In the first example impurities in the form of oxides, such as boron and titanium oxides, are removed from crude kaolinitic clay. This is illustrated in FIGS. 1 and 2, wherein FIG. 1 is a sketch (partly in section) of a contactor adapted for use in accordance with the present invention, and FIG. 2 is a sketch illustrating a detail of the contactor.

The contactor comprises a drum 2 having a rotor 4 carrying discs 6 between and/or through which extend buckets 8. The discs and buckets are spaced from the walls of the drum 2. The clay is mixed thoroughly with water to form a suspension of the clay in water; the impurities which detract from the commercial value of the clay are in the form of particles having sizes of the order of 50 microns and finer and are suspended in the aqueous phase. The suspension is pumped to an inlet port (not shown) towards the bottom of the left hand end of the drum 2, passes through the contactor and is discharged through an exit port 10 at the second end of the drum. The contactor may also be drained through drain port 11 when desired.

A stream of a non-polar organic liquid which is preferably kerosene, but may be any other convenient liquid such as carbon tetrachloride, benzene or a paraffin, is fed continuously to an inlet port (not shown) towards the top of the left hand end of the drum, passes along the drum cocurrent with the suspension, and discharges through an exit port 12 at the right hand end. The flow rates and rotor speed are chosen to give an interface between the aqueous and organic phase approximately on the axis of the drum. The rotor is turned at a speed which does not destroy that interface, yet results in effective intermixing of the two phases in each compartment.

Spaced along the contactor at the level of the axis, preferably on the side of the drum where the buckets rise, there are a number of injection nozzles 14 to which a supply of the collector may be fed and which apply controlled dosing of selected compartments with the collector liquid; dosing is controlled to maintain the concentration of collector at the optimum level for the function it is to perform. There may also be provided sampling points 16 for monitoring the contents of the contactor along its length. The interfacial layer, which forms in the phase disengagment chamber 18 is withdrawn from the right hand end of the contactor, suitably by means such as shown in FIG. 2. Thus a pipe 20, suitably of stainless steel, with an angled end 21, is passed through the end wall 22 of the contactor at a position approximately half way between the axis of the rotor 4 and the periphery of the end wall 22. The pipe is passed through end wall 22 by means of a union nut 24, gland nut 26 and seal 28 (for example of Neoprene). Any entrained air is vented from inside the contactor drum 2 by means of an air vent 10 in the left hand end.

The clay suspension discharged from the contactor is found to have its impurity content much reduced compared with feed supply and to contain little of the organic phase. Similarly the discharged organic phase contains little water or impurities. The interfacial layer contains a high concentration of the impurities in the organic phases and is treated for recovery and recycling of the organic phase and for the concentration of the impurities where they are of value.

In the second example, the raw material to be treated is water-containing oil sands from which bitumen oils are solvent extracted, as described in U.K. Pat. No. 1527269. It has been found that the water layer between the sand and bitumen is loaded with heavy minerals such as the iron carbonates and minerals containing fine metals such as nickel, vanadium and titanium in association with fine clays. Because the water layer between the sand and the bitumen also contains one or more natural collectors in the form of cations of phenolic, sulphidic or carboxylic acids, or their stearates in the form of the salts of these collectors with such light metals as sodium, calcium and magnesium, these heavy minerals, together with associated fine clays, may contribute to the build up of a layer of undesirable impurities at the interface in the form of a crud or emulsion. The interfacial layer is removed either through a separate port at the end of the drum at which the organic phase is discharged, or through ports in the side of the drum as described above. Injection of further collector, either with the organic phase or through nozzles in the side of the drum may be effected but is usually unnecessary.

I claim:

1. A continuous process for the separation of solid impurities from an aqueous phase selected from aqueous slurries, dispersions and suspensions, comprising:
   providing a multi-compartment rotary contactor;
   passing a stream of said aqueous phase through said contactor;
   separately passing through said contactor a stream of an organic phase comprising a non-polar organic liquid;
   supplying the contactor with a collector reagent so as to be present during at least a part of the passage of the streams through the contactor, whereby the impurities are given a hydrophobic surface;
   contacting the phases in the contactor by continuously bringing the aqueous and solvent phases into contact with one another while maintaining an interface between an upper and a lower of the two phases, whereby the impurities collect at the interface;
   removing the two phases from the contactor; and
   independently removing the interfacial layer containing at least a proportion of the impurities initially present in the aqueous phase.

2. The process of claim 1 comprising passing the phases in countercurrent through the contactor.

3. The process of claim 1 comprising passing the phases in cocurrent through the contactor.

4. The process of claim 1 comprising adding the collector reagent to at least one of the streams before its entry to the contactor.

5. The process of claim 1 comprising adding the collector reagent during passage of the streams through the contactor.

6. The process of claim 1 wherein the collector reagent is selected from oleic acid, a long chain amine and a petroleum sulphonate.

7. A continuous process for the separation of solid oxide impurities from an aqueous clay suspension, comprising:
   providing a multi-compartment rotary contactor;
   passing a stream of said aqueous clay suspension through said contactor;
   separately passing through said contactor a stream of an organic phase comprising a non-polar organic liquid;
   adding a collector reagent to at least one of the streams so as to be present during at least a part of the passage of the streams through the contactor, whereby the oxide impurities are given a hydrophobic surface;
   contacting the suspension and organic phase in the contactor by continuously bringing them into contact with one another while maintaining an interface between an upper and a lower of the two phases, whereby the oxide impurities collect at the interface;
   removing the two phases from the contactor; and
   independently removing the interfacial layer containing at least a proportion of the oxide impurities initially present in the aqueous clay suspension.

8. A process according to claim 7 wherein the non-polar organic liquid is kerosene.

9. A continuous process for the separation of solid metal values from an aqueous phase containing oil sands and a naturally occurring collector reagent, comprising:
   providing a multi-compartment rotary contactor;
   passing a stream of said aqueous phase containing oil sands through said contactor;
   separately passing through said contactor a stream of an organic phase comprising a non-polar liquid capable of extracting bitumen oils from said oil sands;
   contacting the phases in the contactor by continuously bringing the aqueous and solvent phases into contact with one another while maintaining an interface between an upper and a lower of the two phases, whereby the metal values collect at the interface;
   removing the two phases from the contactor; and
   independently removing the interfacial layer containing at least a proportion of the metal values initially present in the oil sands.

* * * * *